June 24, 1958     W. R. DILLINGHAM ET AL     2,839,822
GREASE CUP REMOVING TOOL WITH WEDGE AND FULCRUM
Filed April 27, 1956
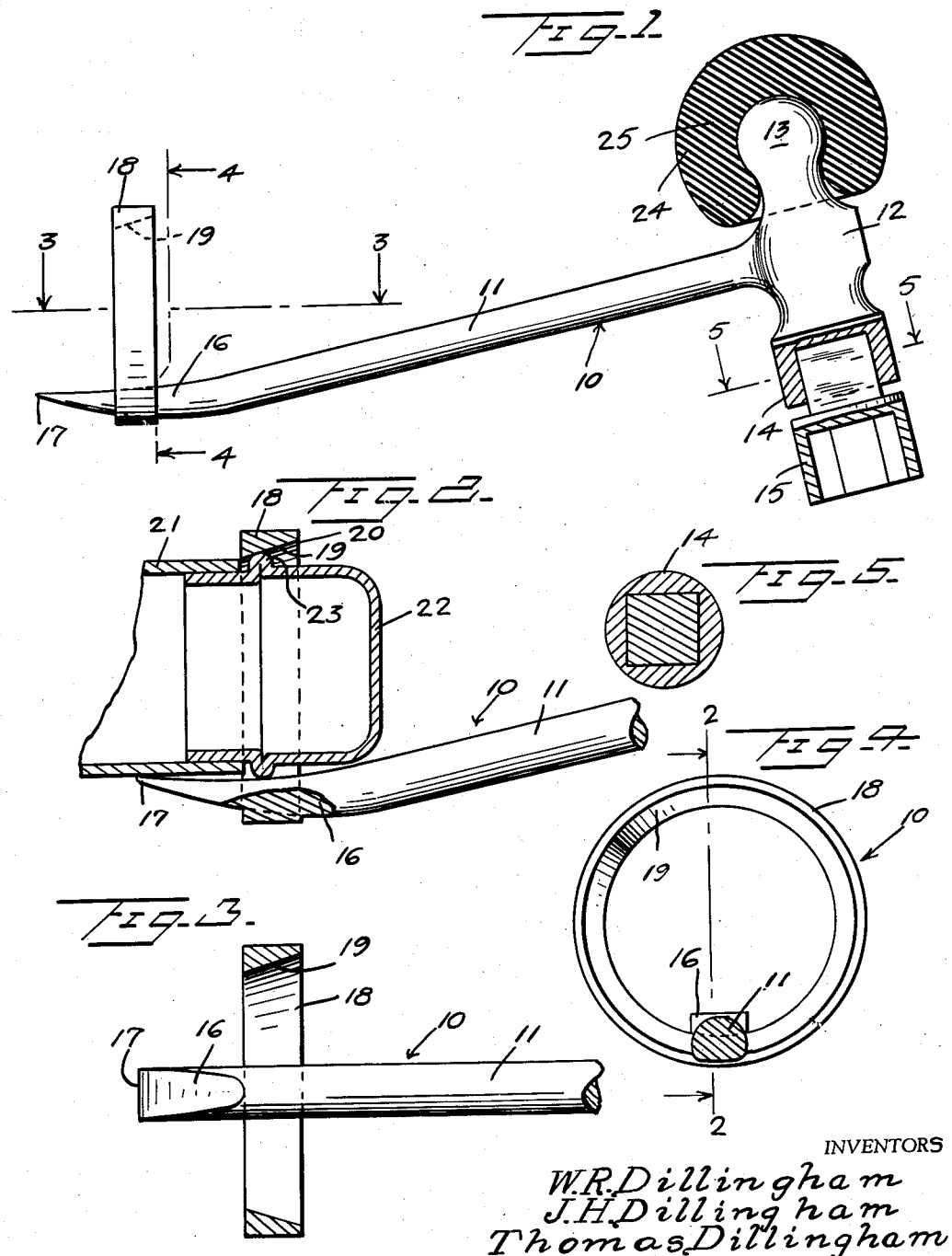
INVENTORS
W.R. Dillingham
J.H. Dillingham
Thomas Dillingham
BY
Kimmel & Crowell ATTORNEYS

United States Patent Office 2,839,822
Patented June 24, 1958

2,839,822

GREASE CUP REMOVING TOOL WITH WEDGE AND FULCRUM

Waldo R. Dillingham, John H. Dillingham, and Thomas Dillingham, Hart, Mich.

Application April 27, 1956, Serial No. 581,045

1 Claim. (Cl. 29—245)

This invention relates to a tool, and more particularly, to a tool for removing and replacing grease retainer cups and wheel disks on automobile wheels.

The primary object of the invention is to provide a tool in the nature of a hammer with a circular wedge prying member for removing grease retainer cups from vehicle wheel structures.

Another object of the invention is to provide a tool of the class described above in which the fulcrum member for the wedge shaped pry-ring comprises a tapered pry point for removing wheel disks.

A further object of the invention is to provide a tool of the class described above having grease retainer cup removing portions, wheel disk removing portions, lug nut removing portions, and resilient hammer portions for replacing the grease retainer cups and wheel disks.

A still further object of the invention is to provide a tool of the class described above which is inexpensive to manufacture, simple to use, and durable in service.

Other objects and advantages will become apparent in the following specification when considered in the light of the attached drawing, in which:

Figure 1 is a side elevation of the invention shown partly in section for clarity.

Figure 2 is a vertical cross-section taken along the line 2—2 of Figure 4, looking in the direction of the arrows.

Figure 3 is an enlarged fragmentary horizontal cross-section taken along the line 3—3 of Figure 1, looking in the direction of the arrows.

Figure 4 is an enlarged transverse cross-section taken along the line 4—4 of Figure 1, looking in the direction of the arrows.

Figure 5 is a horizontal cross-section taken along the line 5—5 of Figure 1, looking in the direction of the arrows.

Referring now to the drawings in detail wherein like reference numerals indicate like parts throughout the several figures, the reference numeral 10 indicates generally a tool constructed in accordance with the invention. The tool 10 is provided with a metallic handle 11 formed of steel rod or similar material and has a ball peen hammer head 12 integrally joined thereto at one end. The ball peen hammer head 12 is provided with a ball head 13 and oppositely extending therefrom a socket portion 14. A socket wrench 15 is adapted to be fitted within the socket portion 14 and can be utilized to remove the lug nuts securing the conventional wheel to a motor vehicle.

The opposite end of the handle 11 is provided with a tapered terminal extension 16 which extends at a slight angle to the handle 11 and terminates in a sharpened end edge 17. A ring like member 18 is formed with a conical bore 19 with the larger end 20 of the bore 19 extending toward the handle 11. The conical bore 19 in the member 18 provides the member 18 with a wedge shaped cross-section which is best illustrated in Figures 2 and 3.

A wheel hub 21 is provided with a conventional grease retainer cup 22 having a peripheral bead 23 formed thereon in the usual manner. The normal method in removing the grease retainer cup 22 from the hub 21 is to beat upon the grease retainer cup 22 with a hammer until the bead 23 has been struck enough blows to cause the grease retainer cup 22 to slide out of the hub 21. This method of removing the grease retainer cup 22 seriously damages the grease retainer cup and oftentimes makes it impossible for the same grease retainer cup 22 to be replaced in the hub 21, and hence the expense of the job is materially increased.

To remove the grease retainer cup 22 utilizing the present invention, the wedge shaped ring 18 is engaged over the grease retainer cup 22 so that the wide part of the wedge is engaged behind the bead 23 of the grease retainer cup 22. The point 17 on the tapered extension 16 of the handle 11 is engaged against the hub 21 and by prying downwardly on the handle 11 the ring 18 is caused to swing outwardly at its upper end portion moving the bead 23 and the grease retainer cup 22 outwardly.

Obviously should the grease retainer cup 22 become jammed by being pushed out of line in the hub 21 the ring 18 and the fulcrum sharpened edge 17 can be rotated about the hub 21 so that a new point of pressure can be used in removing the grease retainer cup 22.

The ball peen hammer 12 is provided with a ball like rubber cover 24 which is adapted to be engaged over the hammer head 13 which heats in a socket 25 within the rubber ball 24.

It can readily be seen that the present invention provides a complete tool kit for all phases of removing and replacing wheels, grease retainer cups, wheel disks, and the like.

Having thus described the preferred embodiment of the invention it should be understood that numerous structural modifications and adaptations may be resorted to without departing from the scope of the appended claim.

What is claimed is:

A tool for removing grease retainer cups from wheel hubs, said tool comprising a ring having a conical bore providing an inner surface to engage behind a bead on the exterior of a cup to be removed, an elongated handle having a portion extending through said ring and secured thereto along one edge thereof, the handle portion extending through said ring terminating in a sharpened edge and forming a fulcrum for said ring.

References Cited in the file of this patent

UNITED STATES PATENTS

| | | |
|---|---|---|
| 2,049,489 | Christen | Aug. 4, 1936 |
| 2,113,408 | Nelson | Apr. 5, 1938 |
| 2,266,511 | Predmore | Dec. 16, 1941 |

FOREIGN PATENTS

| | | |
|---|---|---|
| 879,366 | Germany | June 11, 1953 |